Oct. 20, 1931.  F. W. DOUTHITT  1,828,647
CUTTER HEAD FOR CORN CUTTING MACHINES
Filed June 27, 1928  3 Sheets-Sheet 1
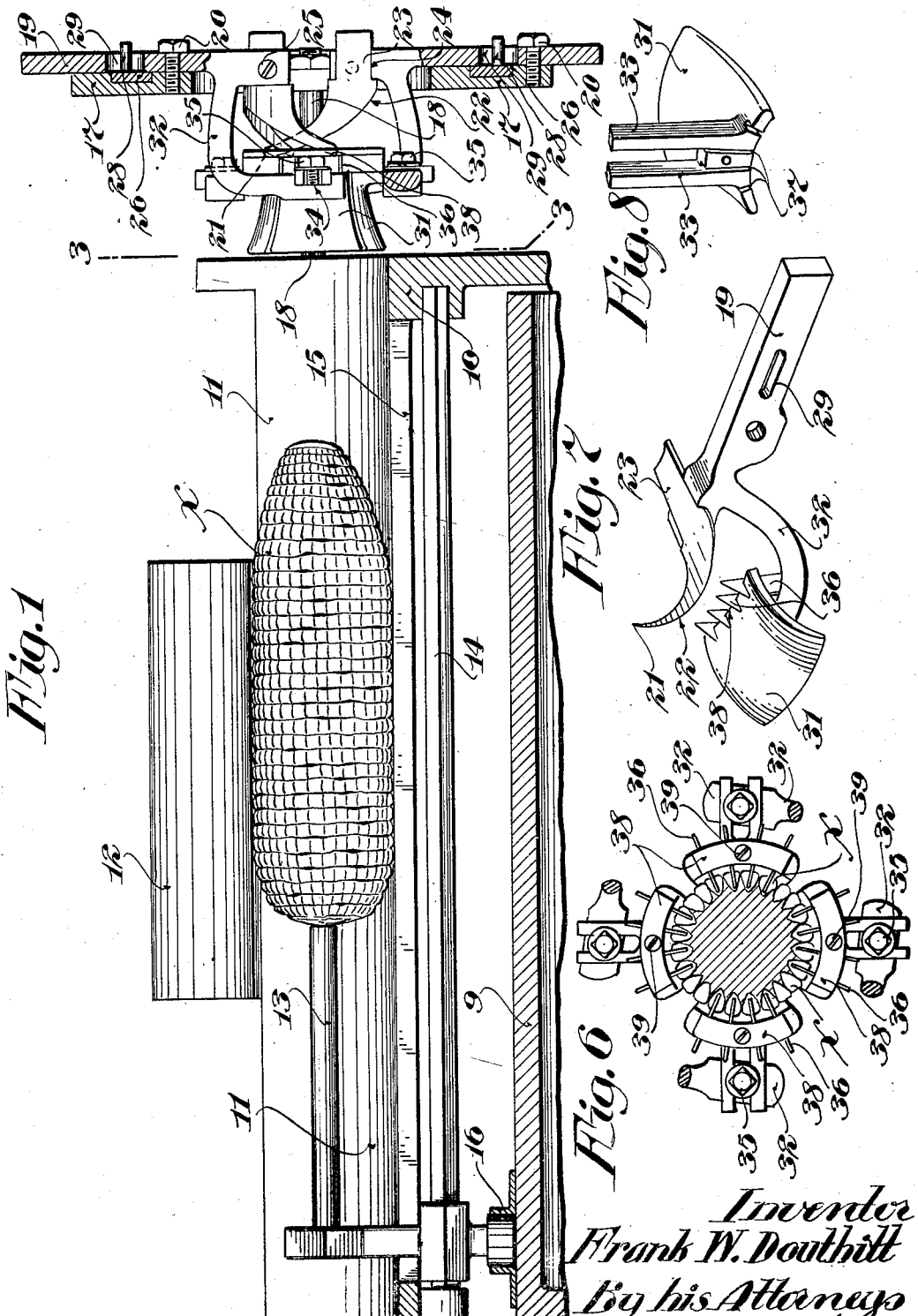
Inventor
Frank W. Douthitt
By his Attorneys

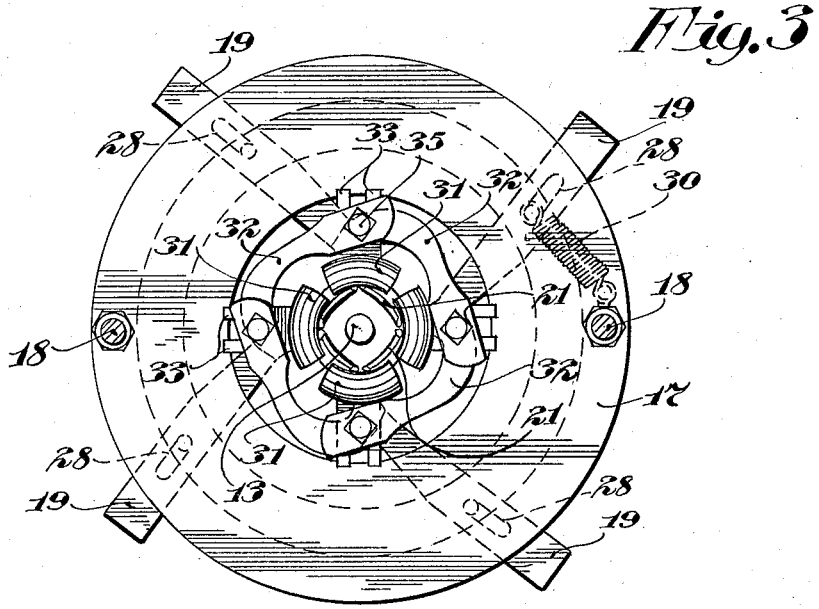
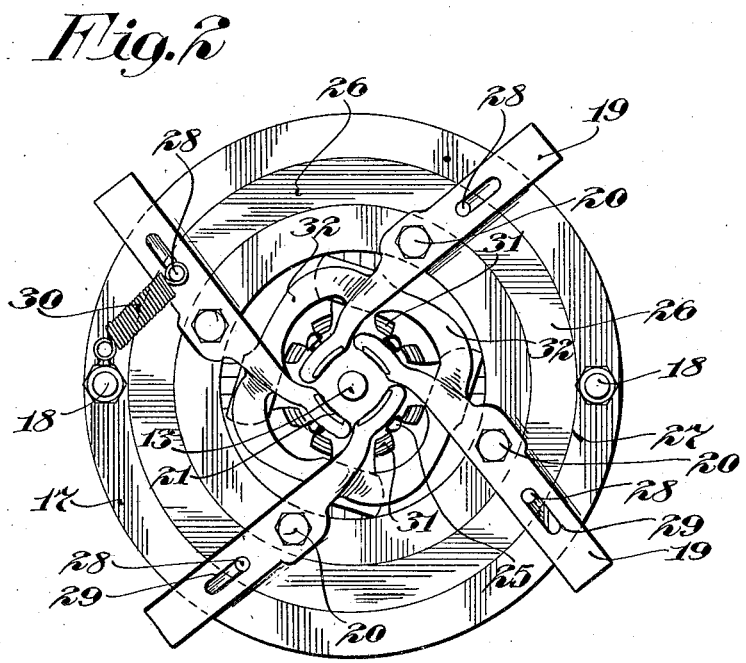

Oct. 20, 1931.　　F. W. DOUTHITT　　1,828,647
CUTTER HEAD FOR CORN CUTTING MACHINES
Filed June 27, 1928　　3 Sheets-Sheet 3
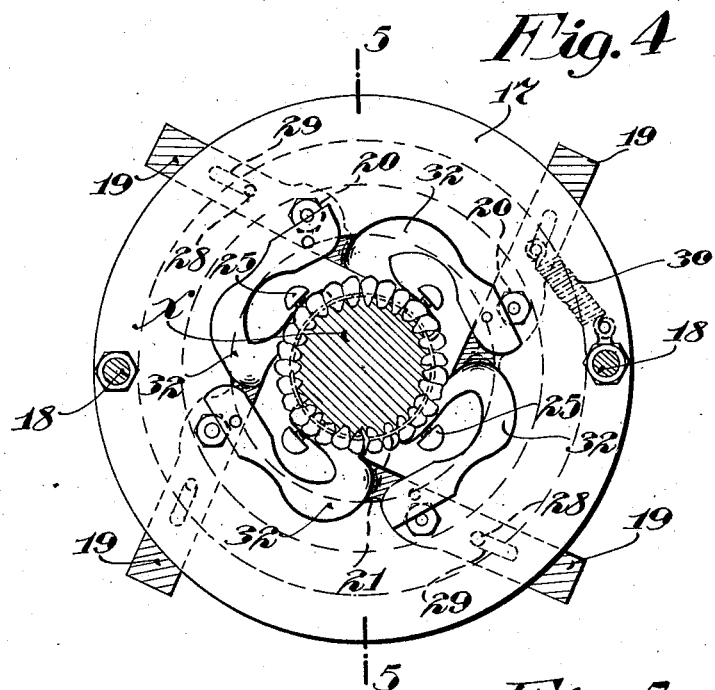
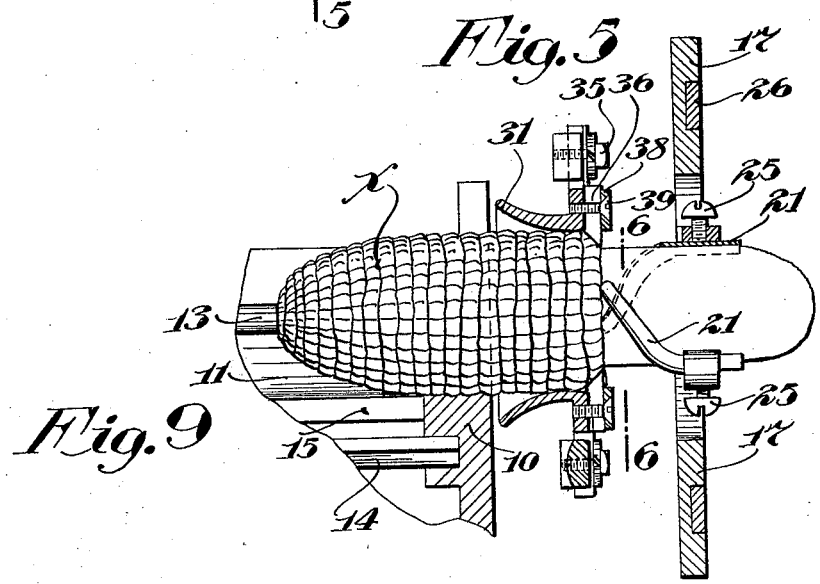
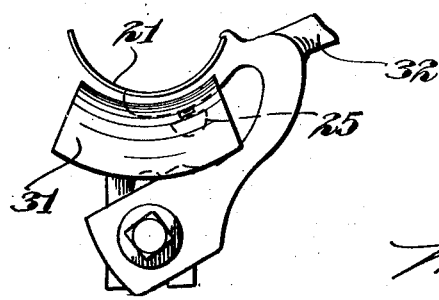
Inventor
Frank W. Douthitt
By his Attorneys
Merchant and Kilgore Patented Oct. 20, 1931

1,828,647

UNITED STATES PATENT OFFICE

FRANK W. DOUTHITT, OF ORTONVILLE, MINNESOTA

CUTTER HEAD FOR CORN CUTTING MACHINES

Application filed June 27, 1928. Serial No. 288,648.

My present invention has for its object the provision of a highly efficient cutter head intended for general use in cutting the kernels of corn from the cobs and especially well adapted for use in canning factories and the like during the preparation of green corn for canning or otherwise preserving the same. Said cutter head, while applicable to various different types of corn cutting machines, is particularly well adapted for use in connection with my "corn cutting machine", disclosed and broadly claimed in an application for United States Letters Patent executed of even date herewith.

To the above end, the invention consists of the novel devices and combinations of devices hereinafter described and defined in the claim.

In the accompanying drawings, which illustrate the invention, like characters indicate like parts throughout the several views.

Referring to the drawings:

Fig. 1 is a fragmentary view partly in side elevation and partly in central vertical section of a corn cutting machine having the invention embodied therein;

Fig. 2 is a front elevation of one of the improved cutter heads;

Fig. 3 is a view partly in elevation and partly in transverse vertical section taken on the line 3—3 of Fig. 1;

Fig. 4 is a view corresponding to Fig. 3 with the exception that some parts are removed and further showing an ear of corn in the cutter head;

Fig. 5 is a view principally in section taken on the line 5—5 of Fig. 4;

Fig. 6 is a view principally in section taken on the line 6—6 of Fig. 5;

Fig. 7 is a perspective view of one of the sections of the depth gauge and connected cutter blade;

Fig. 8 is a perspective view of one of the sections of the depth gauge; and

Fig. 9 is a front elevation of the parts shown in Fig. 7.

Of the parts of the corn cutting machine illustrated and which is the subject matter of the application heretofore referred to, it is only necessary to note the inner and outer drums 9 and 10, the former of which is fixed and the latter of which is mounted to rotate about the axis of said fixed drum. In the periphery of the outer drum 10 and extending longitudinally thereof is a plurality of circumferentially spaced pockets 11, only one of which is shown, for positioning ears of corn $x$ to be fed to cutter heads, as will hereinafter appear. A retaining spring 12 yieldingly holds the ears of corn $x$ in the pockets 11 while they are being fed to the cutter heads.

For each pocket 11 is a feed device 13 for moving the ears of corn $x$ in said pockets 11 to the cutter heads. These feed devices 13 are slidably mounted on fixed shafts 14 carried by the drum 10 and which feed devices extend into the pockets 11 through longitudinal slots 15 in the bottoms thereof. A fixed endless channel cam 16 on the periphery of the fixed drum 9 is provided for reciprocating the feed devices 13 under the rotation of the drum 10.

Referring now in detail to the cutter heads which are the subject matter of the present invention, each thereof includes an annular head plate 17 which extends parallel to the outer face of the head of the drum 10, is rigidly secured thereto and held spaced outward therefrom by a pair of anchoring bolts 18. These cutter heads are located at the delivery ends of the pockets 11 with the axes of their head plates 17 aligned with the longitudinal centers of the pockets 11. A plurality of levers 19, as shown four, are intermediately pivoted at 20 to each head plate 17 and cutter blades 21 are mounted on the inner end portions of said levers. These cutter blades 21 are formed transversely concave and have long oblique cutting edges 22. Said cutter blades 21 are removably mounted in transverse seats 24 in the levers 19 by providing said blades with tapered tangs 23 which have dove-tailed interlocking engagement with said seats, as best shown in Fig. 7.

In addition to the wedge action that secures the tangs 23 in the seats 24, the cutter blades 21 are further secured to the levers 19 by set screws 25 that have threaded engagement with said levers, extend into the seats 24 and impinge against said tangs. The cutter blades 21 are held by the levers 19 in circumferentially spaced arrangement for contracting and expanding movements about the projected axis of the head plate 17.

For causing the cutter blades 21 to move simultaneously in respect to a common axis for expanding or contracting movements to vary the size of the passageway therebetween for action on ears of corn of different sizes, the levers 19 are connected by an annular shift ring 26. This shift ring 26 is mounted in an annular channel 27 in the outer face of the head plate 17 and is connected to the levers 19 by perpendicular pins 28 on said ring and which pins extend through longitudinally extended slots 29 in the outer end portions of said levers. The shift ring 26 underlies the levers 19 and is held thereby in its channel 27.

A coiled spring 30 anchored to one of the bolts 18 and attached to one of the pins 28 is so arranged as to normally and yieldingly hold the shift ring 26 in a position in which the cutter blades 21 are contracted to the smallest diameter of the passageway therebetween.

Co-operating with the cutter blades 21 is a cylindrical depth gauge 31 automatically controlled by an ear of corn passing therethrough to said cutter blades. This depth gauge 31 comprises circumferentially spaced sections, the inner faces of which are transversely concave and have flaring receiving ends for the ears of corn that are fed thereto from the pockets 11. These sections of the depth gauge 31 are individually carried by curved arms 32 integrally formed with the inner end portions of the levers 19.

To vary the depth of cut made by the cutter blades 21, the sections of the depth gauge 31 are mounted for radial adjustment in respect to the axis of the passageway between the cutting blades 21 and through the depth gauge 31. As one means for thus mounting the sections of the depth gauge 31 each section thereof is provided with an outwardly and radially extended extension 33 slidably mounted in a channel seat 34 in the respective arm 32. A binding screw 35 extends between the prongs of the extension 33, has screw-threaded engagement with the arm 32 with its head impinging against said extension and frictionally clamps the extension 33 in its seat 34. By reference to Fig. 9, it will be noted that the cutter blades 21 and depth gauge 31 are concentric.

To improve the appearance of the cut kernels of corn particularly when put up in glass jars for display purposes, said kernels are cut by the slitting knives 36 longitudinally of the cob just in advance of the cutter blades 21. As shown, there is a plurality of these slitting knives 36 carried by each section of the depth gauge 31. These slitting knives 36 are radially extended and circumferentially spaced about the passageway in the depth gauge 31 and mounted in notch-like seats 37 in said sections for endwise adjustment radially in respect to said passageway. Said slitting knives 36 have oblique cutting edges 38 and 39 and are adjustably but rigidly held in the seats 37 by segmental clamping plates 38 which rest on the backs of said knives and are secured by screws 39 to the extensions 33 which frictionally clamp said knives in their seats 37.

By endwise adjusting the slitting knives 36, the depth to which the kernels of corn are cut, as shown in Fig. 6, may be varied at will. These slitting knives 36 may be readily removed from the depth gauge 31 in case the kernels are to be left whole.

The operation of the above described cutter head may be briefly described as follows: The ears of corn $x$ are placed in the pockets 11 by the operator of the machine, as fully described in the application heretofore referred to, with the little ends of the ears projecting toward the cutter heads, one of which is shown in Fig. 1. Upon the placing of the ears of corn $x$ in the seats 11, the feed devices 13 move the same longitudinally in said seats and inject the same into the flaring end of the depth gauge 31 and thereby expand said gauge to permit the ears of corn to pass therethrough.

As the ear moves through the depth gauge, the slitting knives 36 and cutter blades 21 are automatically positioned thereby and the former slit the kernels of the corn and the latter thereafter cut the same from the cob. The oblique cutting edges of the slitting knives 36 freely pass through the kernels of corn longitudinally of the cob and the cutter blades 21 at their oblique cutting edges 21 spirally cut the kernels from the cob to the desired depth with a drawing action and the ear is moved endwise by the feed device 13. At the completion of the cutting of the kernels from the cob, said cob is ejected from the cutter head by the feed device 13.

Obviously, the cutter blades 21 may be readily removed from the levers 19 for the purpose of repairing or sharpening the same or substituting new blades therefor. Likewise the slitting knives 36 may be readily removed from the depth gauge or adjusted to vary the depth of the cut thereof. It is also evident that the sections of the depth gauge 31 may be readily adjusted in respect to the cutter blades 21 to vary the depth to which the blades cut the kernels of corn from the cob.

During the passage of an ear of corn through the cutter head by the respective feed device, the spring 30, acting on the shift ring 36, yieldingly holds the sections of the depth gauge 31 in contact with the ear and permits free expanding and contracting movements thereof so as to freely follow the contour of the ear both longitudinally and circumferentially for the removal of all of the kernels therefrom to the desired depth without undue waste.

What I claim is:

A cutter head for a corn cutting machine comprising a non-rotating supporting plate having a central opening therethrough, a series of levers pivotally attached to said supporting plate and movable in a plane parallel with the face of the supporting plate, each lever at its inner end having a seat for a cutter blade, a cutter blade having a supporting tang attached to the seat on each lever, each blade being narrow and spirally arranged to form a cutting cylinder, said lever having arms thereon projecting in front of the cutting blades, a depth gage supported on each arm and shiftable radially of the cutter head to different set positions on said arms, said supporting plate having an annular channel formed in one face thereof inwardly from the peripheral edge of said plate, a ring disposed in said annular channel, devices carried by said ring and connected to said levers for shifting the levers simultaneously to contract or expand the cutting cylinder, and spring means connected to said ring and having connection with said plate for shifting said ring so as to yieldingly hold the cutting blades in their contracted position.

In testimony whereof I affix my signature.

FRANK W. DOUTHITT.